(12) United States Patent
Nelson (10) Patent No.: US 10,698,404 B2
(45) Date of Patent: Jun. 30, 2020

(54) FACILITATING LANE-SPLITTING BY MOTORCYCLES

(71) Applicant: Ford Global Technologies, LLC, Dearborn, MI (US)

(72) Inventor: Zachary David Nelson, San Mateo, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 138 days.

(21) Appl. No.: 15/761,733

(22) PCT Filed: Oct. 20, 2015

(86) PCT No.: PCT/US2015/056446
§ 371 (c)(1),
(2) Date: Mar. 20, 2018

(87) PCT Pub. No.: WO2017/069740
PCT Pub. Date: Apr. 27, 2017

(65) Prior Publication Data
US 2018/0275650 A1 Sep. 27, 2018

(51) Int. Cl.
| | |
|---|---|
| *G05D 1/00* | (2006.01) |
| *B60Q 1/50* | (2006.01) |
| *G08G 1/16* | (2006.01) |
| *B62J 27/00* | (2020.01) |
| *B60Q 1/52* | (2006.01) |
| *B60Q 1/38* | (2006.01) |
| *B60Q 1/46* | (2006.01) |
| *B60Q 1/32* | (2006.01) |
| *G05D 1/02* | (2020.01) |

(52) U.S. Cl.
CPC ............. *G05D 1/0055* (2013.01); *B60Q 1/32* (2013.01); *B60Q 1/38* (2013.01); *B60Q 1/46* (2013.01); *B60Q 1/50* (2013.01); *B60Q 1/525* (2013.01); *B62J 27/00* (2013.01); *G05D 1/0276* (2013.01); *G08G 1/166* (2013.01)

(58) Field of Classification Search
None
See application file for complete search history.

(56) References Cited

U.S. PATENT DOCUMENTS

| | | | |
|---|---|---|---|
| 5,109,214 A | 4/1992 | Heidman, Jr. | |
| 6,411,896 B1 | 6/2002 | Shuman | |
| 8,352,112 B2 | 1/2013 | Mudalige | |
| 8,473,144 B1 | 6/2013 | Dolgov | |
| 8,520,695 B1 | 8/2013 | Rubin | |
| 9,478,137 B1 * | 10/2016 | Nelson | G08G 1/161 |

(Continued)

*Primary Examiner* — Dale W Hilgendorf
*Assistant Examiner* — Alexander C. Bost
(74) *Attorney, Agent, or Firm* — David R. Stevens; Stevens Law Group (57) ABSTRACT

A controller of a motorcycle determines that the motorcycle is lane-splitting. The controller transmits a notification to vehicles in proximity to the motorcycle. In response to the notifications, the vehicles facilitate lane-splitting by the motorcycle. In particular the vehicles may flash lights to communicate that the vehicle has received the notification and will facilitate lane-splitting. The vehicles may facilitate lane-splitting by refraining from performing lane changes. The vehicles may further notify the motorcycle if lane changes are needed and the motorcycle controller may provide an alert to a rider.

14 Claims, 6 Drawing Sheets

(56) References Cited

U.S. PATENT DOCUMENTS

| | | | |
|---|---|---|---|
| 9,598,076 B1* | 3/2017 | Jain | B60W 30/09 |
| 9,858,621 B1* | 1/2018 | Konrardy | H04W 4/90 |
| 10,347,127 B2* | 7/2019 | Droz | B60W 50/0098 |
| 10,403,140 B2* | 9/2019 | Banvait | G08G 1/167 |
| 2008/0125972 A1 | 5/2008 | Neff | |
| 2008/0161986 A1 | 7/2008 | Breed | |
| 2012/0046820 A1 | 2/2012 | Allard | |
| 2012/0212320 A1 | 8/2012 | Oberholtzer | |
| 2012/0283912 A1 | 11/2012 | Lee | |
| 2013/0116915 A1 | 5/2013 | Ferreira | |
| 2013/0127638 A1 | 5/2013 | Harrison | |
| 2013/0311075 A1* | 11/2013 | Tran | B60W 30/09 |
| | | | 701/117 |
| 2014/0236414 A1 | 8/2014 | Droz et al. | |
| 2015/0166062 A1 | 6/2015 | Johnson | |
| 2016/0306357 A1* | 10/2016 | Wieskamp | B62D 15/0265 |
| 2017/0169710 A1* | 6/2017 | Beaurepaire | B60W 30/16 |

\* cited by examiner

FACILITATING LANE-SPLITTING BY MOTORCYCLES

RELATED APPLICATIONS

This application claims the benefit of PCT Application Serial No. PCT/US2015/056446, filed Oct. 20, 2015, which is hereby incorporated herein by reference in its entirety for all purposes.

BACKGROUND

Field of the Invention

This invention relates to performing obstacle avoidance in autonomous vehicles.

Background of the Invention

In many congested, urban areas like San Francisco, Calif. or London, UK, motorcyclists often overtake slow or stopped vehicles in the traffic by traveling between lanes, namely lane-splitting. This is a very dangerous driving activity since it is hard for drivers in adjacent vehicles to detect such activities, especially when lanes are merging. Even for future autonomous vehicles, which might have built-in 360 degree sensing systems, it would be challenging to identify fast moving objects like motorcycles changing lanes at much higher relative speeds. This difficulty would hence present challenges to the overall sensing suites and algorithms. It is further problematic where objects or vehicles occlude a sensing system.

The systems and methods disclosed herein provide an approach for improving safety of lane-splitting motorcyclists.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
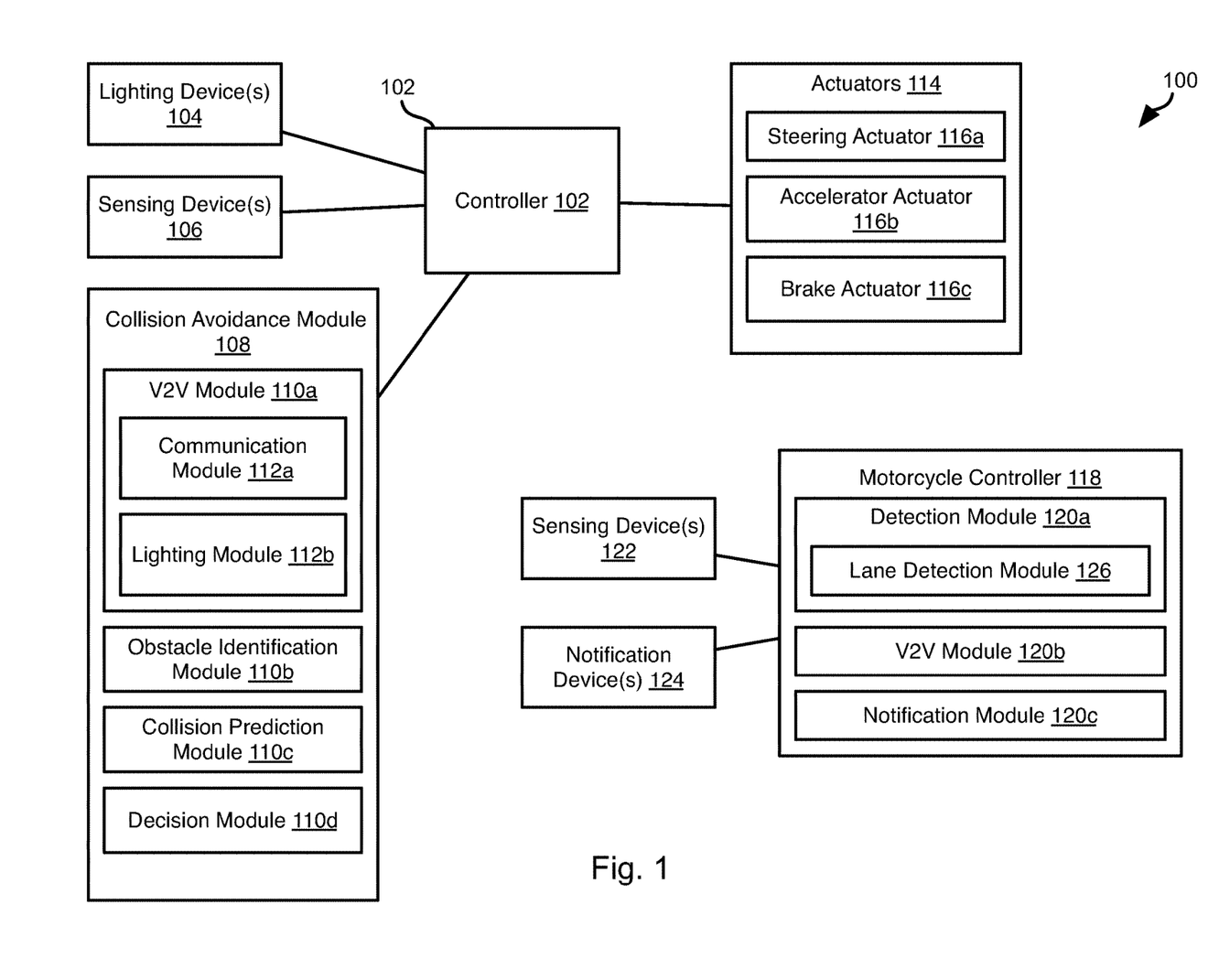
FIG. 1 is a schematic block diagram of a system for implementing embodiments of the invention.

Referring to FIG. 1, a controller 102 may be housed within a vehicle. The vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, the controller 102 may perform autonomous navigation and collision avoidance. In particular, the controller may coordinate lane-splitting by motorcyclists as discussed in greater detail below with respect to FIGS. 3 and 4.

The controller 102 may be coupled one or more lighting devices 104 for signaling to motorcyclists. The lighting devices may include lights conventionally included on a vehicle, such as back up lights, brake lights, indicator lights, side lights, or other lights mounted to the vehicle in any manner known in the art. The lighting devices 104 may preferably include at least one light on the left side and at least one light on the right side of the vehicle.

The controller 102 may be coupled to one or more sensing devices 106, which may include microphones or cameras for detecting the environment of the vehicle. The one or more sensing devices 106 may include other sensors useful for detecting obstacles, such as RADAR, LIDAR, SONAR, ultrasound, and the like.

The controller 102 may execute a collision avoidance module 108 that receives the image streams and audio streams and identifies possible obstacles and takes measures to avoid them. The collision avoidance module 108 may include a V2V (vehicle to vehicle) module 110a. The V2V module 110a includes a communication module 112a configured to communicate wirelessly with adjacent vehicles to exchange information, such as regarding a motorcycle that is, or is about, to perform lane-splitting. The V2V module 110a may further include a lighting module 112b that activates one or more lighting devices 104 in response to both (a) detecting that a motorcyclist is, or is about to, perform lane-splitting and (b) determining that the vehicle will not take action that will interfere with the lane-splitting. The function of the V2V module 110a is described in greater detail below with respect to FIGS. 3 and 4.

The collision avoidance module 108 may further include an obstacle identification module 110b, collision prediction module 110c, and decision module 110d. The obstacle identification module 110b analyzes the one or more image streams and identifies potential obstacles, including people, animals, vehicles, buildings, curbs, and other objects and structures. In particular, the obstacle identification module 110b may identify vehicle images from outputs of the sensing devices 106, such as image streams from one or more cameras or a using data from a LIDAR, RADAR, ultrasound, or other sensing system.

The collision prediction module 110c predicts which obstacle images are likely to collide with the vehicle based on its current trajectory or current intended path. The decision module 110d may make a decision to stop, accelerate, turn, etc. in order to avoid obstacles. The manner in which the collision prediction module 110c predicts potential collisions and the manner in which the decision module 110d takes action to avoid potential collisions may be according to any method or system known in the art of autonomous vehicles.

The decision module 110d may control the trajectory of the vehicle by actuating one or more actuators 114 controlling the direction and speed of the vehicle. For example, the actuators 114 may include a steering actuator 116a, an accelerator actuator 116b, and a brake actuator 116c. The configuration of the actuators 116a-116c may be according to any implementation of such actuators known in the art of autonomous vehicles.

A motorcycle may include a motorcycle controller 118 including a detection module 120a that detects when the motorcycle is lane-splitting, such as using one or more sensing devices 122. Detecting lane-splitting may include implementing some or all of the methods and systems disclosed in U.S. application Ser. No. 14/741,591, filed Jun. 17, 2015, and entitled DETECTING AND COMMUNICATING LANE SPLITTING MANEUVER, which is hereby incorporated herein by reference in its entirety.

Sensing devices 122 may include a forward facing camera and the detection module 120a may detect lane-splitting by detecting that a lane marker is within threshold proximity to a center of the field of view of the forward facing camera. The detection module 120a may also detect lane-splitting by determining a separation between vehicles on either side of the camera. If the distance is below some threshold distance, e.g. less than 50% of a lane width, then the detection module 120a may determine that the motorcycle is lane-splitting.

The controller 118 may include a V2V module 120b configured to communicate with the V2V modules 110a of other vehicles. As described in greater detail herein, the V2V module 120b may notify other vehicles that the motorcycle is lane-splitting.

The controller 118 may further include a notification module 120c configured to provide notifications to a driver of the motorcycle using one or more notification devices 124. The notification devices 124 may include haptic feedback devices, speakers, lights, screens, or other types of output devices. The notification module 120c may output notifications to a driver of the motorcycle in response to events, such as messages received from a vehicle using the V2V module 120b. For example, the notification module 120c may produce an alert in response to receiving a notification from another vehicle indicating that the vehicle is about to change lanes.

Figure 2:
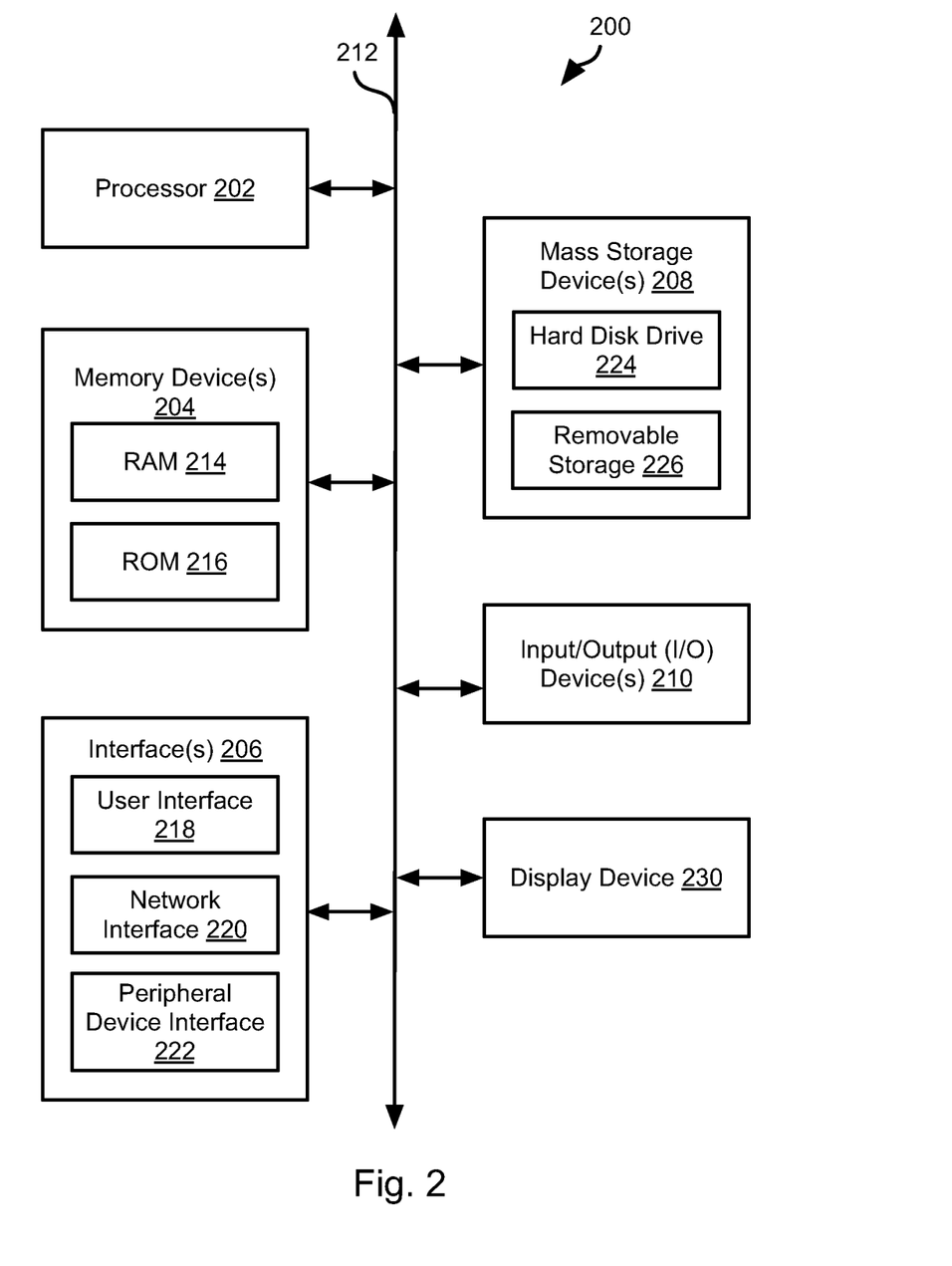
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controllers 102, 118 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212.

Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
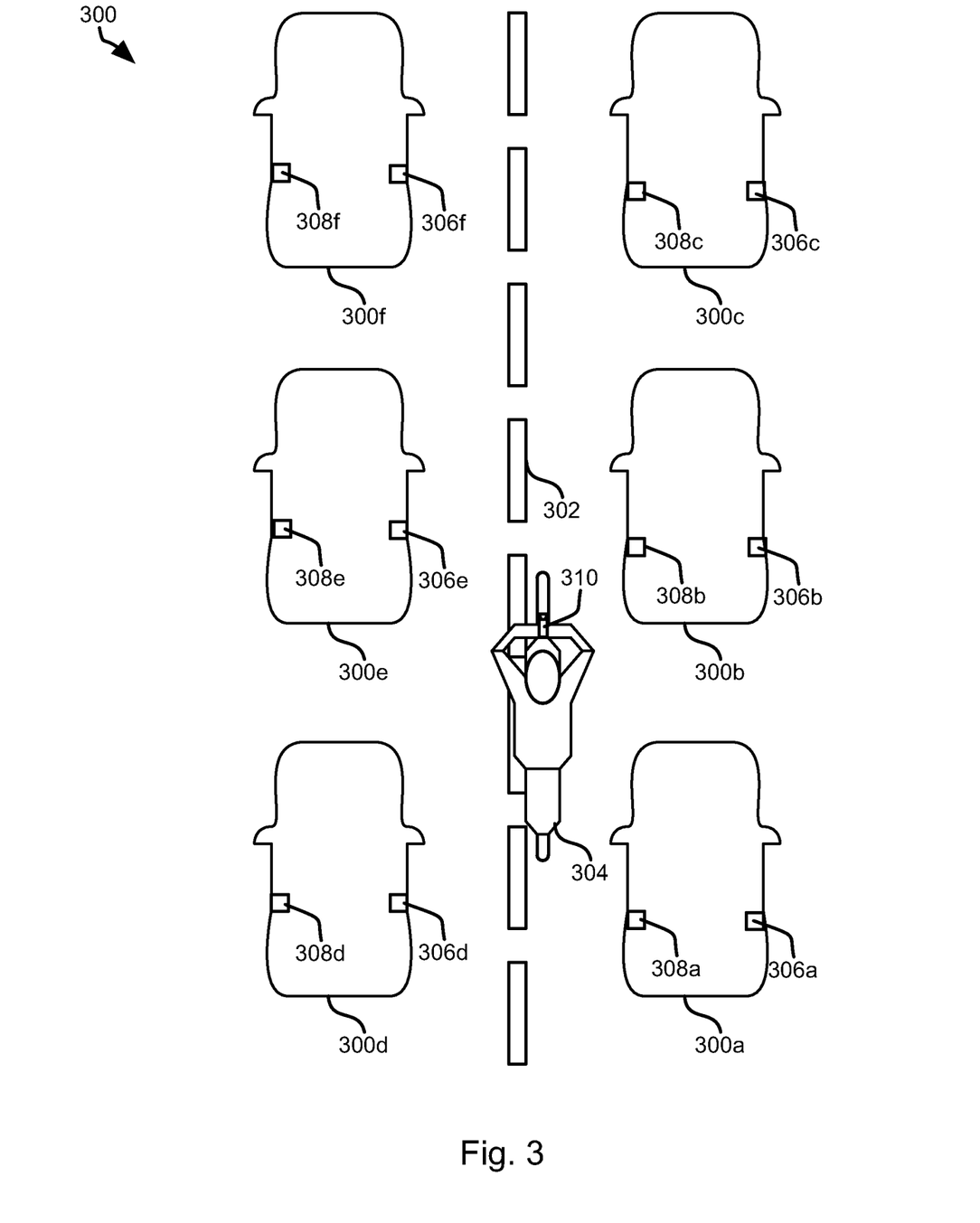
FIG. 3 is a schematic diagram illustrating an autonomous vehicle in traffic including a lane-splitting motorcyclist.

Turning now to FIG. 3, vehicles 300a-300f in multi-lane traffic may travel in lanes on either side of a dividing line 302 between the lanes. A motorcyclist 304 may travel between the lanes, e.g. on or about the dividing line 302. The motorcyclist 304 will typical travel faster than the other vehicles 300a-300f and provides little time to react. Furthermore, where the vehicles 300a-300f are moving slowly, the gaps between them may be small and visibility behind each vehicle may be limited as a result.

In FIG. 3, each vehicle includes the controller 102 housed therein as well as lighting devices 104 embodied as right side lights 306a-306f and left side lights 308a-308f. Other positions and types of lighting devices may be used according to the methods described herein. For example, the back up lights, signal lights, and brake lights, may be used rather than side lights 306a-306f, 308a-308f. For example, such lights may be activated using a distinctive flashing pattern to clearly indicate an acknowledgement that a motorcycle 304 is lane-splitting. In some embodiments, lights 306a-306f, 308a-308f may shine on a panel of the vehicle to provide a broad illuminated surface.

In either case, lights of multiple vehicles 300a-300f may be activated simultaneously and/or according to an undulating or traveling pattern in order to indicate a clear path for a lane-splitting motorcycle 304. For example, lights 308a-308c may be flashed sequentially and in order and lights 306d-306f may be flashed sequentially and in order so that the flashing lights 306d-306f, 308a-308c clearly indicate a clear path for the motorcycle 304.

In the embodiment of FIG. 3, the motorcycle 304 includes a sensing device 122 embodied as a forward facing camera 310. The forward facing camera 310 may be centered on a longitudinal (front to back) axis of the motorcycle 304 such that the path of the motorcycle when traveling straight is centered in the field of view of the camera. Accordingly, proximity of the lane marker 302 to the center of field of view of the camera 310 may be used to determine whether the motorcycle 304 is lane-splitting.

Figure 4:
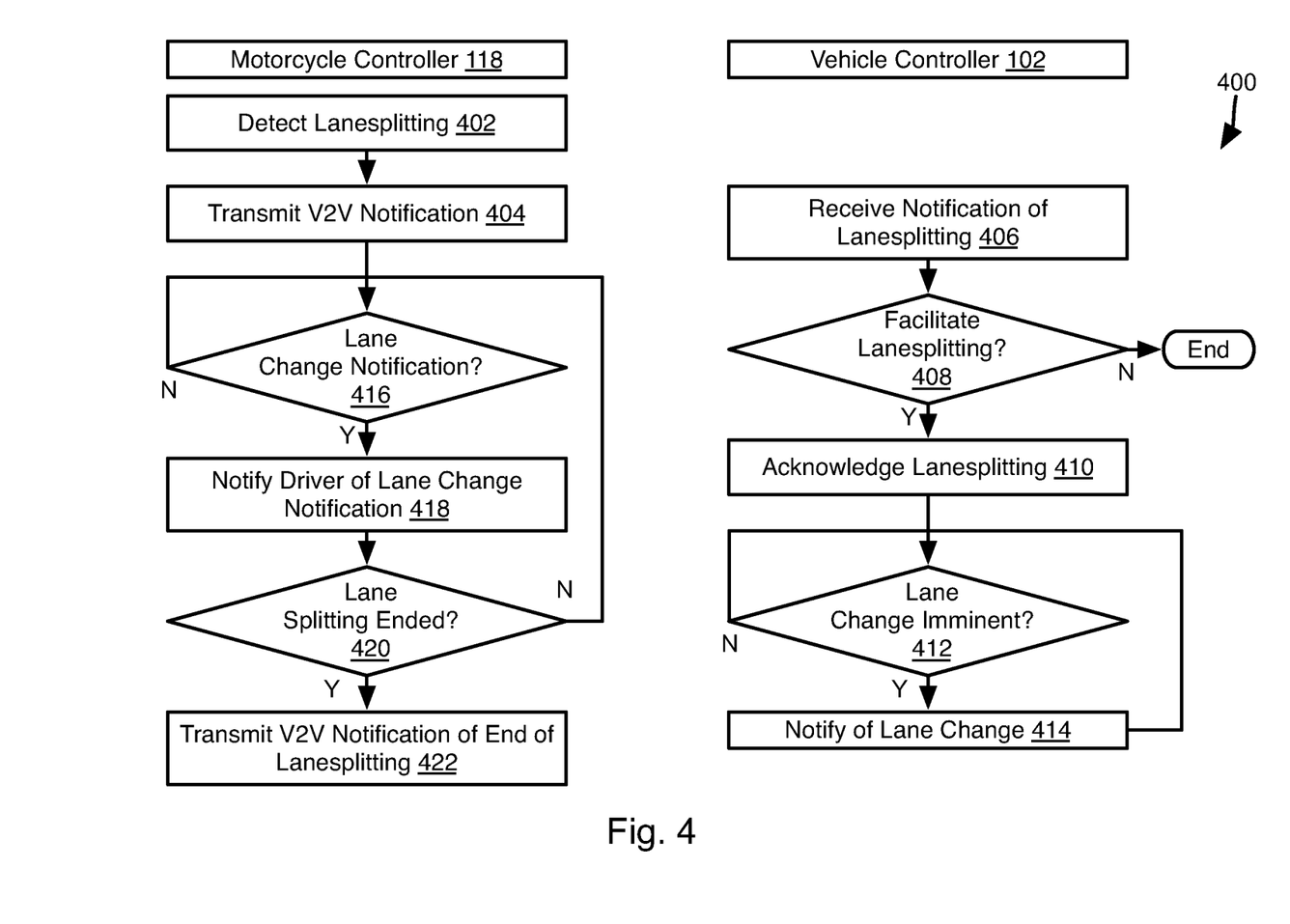
FIG. 4 is a process flow diagram of a method for enhancing safety of lane-splitting motorcyclists in accordance with an embodiment of the invention.

FIG. 4 illustrates a method 400 that may be executed by a motorcycle controller 118 of a motorcycle 304 and the controllers 102 of one or more vehicles 300a-300f in order to facilitate lane-splitting by the motorcycle 304. For example, the illustrated method 400 may be executed by the collision avoidance module 108 and the V2V module 110a thereof. The motorcycle controller 118 may perform its portion of the method 400 using the detection module 120a, V2V module 120b, and the notification module 120c.

The method 400 may include detecting 402, by the motorcycle controller 118, whether the motorcycle is currently lane-splitting. This may include determining proximity of the lane marker 302 to the center of the field view of the camera 310 as described in greater detail with respect to FIGS. 5 and 6 below.

In response to detecting 402 lane-splitting, the motorcycle controller 118 may transmit 404 a notification to any vehicles in proximity to the motorcycle 304. For example, the signal may be transmitted to vehicles within 10 meters, 20 meters, 50 meters, or some other distance from the motorcycle 304. The notification may be transmitted according to any wireless protocol, particularly any vehicle to vehicle (V2V) protocol such as the dedicated short range communication (DSRC) protocol. In some embodiments, vehicles that receive the notification 404 may transmit an acknowledgment of the notification over the V2V protocol. However, this step may be omitted.

The vehicle controller 102 of vehicles within range of the notification of step 404 may then receive 406 the notification and determine 408 whether the vehicle will facilitate lane-splitting. This may include presenting a message to the driver by means of a screen, audible alert, or other signal, requesting a decision from the driver. If the driver provides an input consenting to facilitating lane-splitting, then step 410 may be performed. Otherwise, the method may end. In some embodiments, the determination at step 408 may be performed automatically. For example, the controller 102 may determine whether a lane change will be needed within some threshold time period from the current time, e.g., whether a lane change will be required in order to reach a destination to which the vehicle controller 102 is navigating.

If the vehicle controller 102 determines 408 that it will facilitate lane-splitting, then the method 400 may include acknowledging 410 the lane-splitting. Acknowledging lane-splitting may include activating lights on one or both of the right and left sides of the vehicle, such as the side lights 306a-306f, 308a-308f. Activating the side lights 306a-306f, 308a-308f may include activating them with a blinking pattern that is distinctive and clearly communicates to the rider of the motorcycle 304 that the vehicle will facilitate lane-splitting. In some embodiments, the flashing of lights on a row of cars may be coordinated or synchronized in order to provide a flashing pattern, such as sequentially activating lights in a row of cars to make a running or undulating pattern. Accordingly, a controller 102 may communicate with other vehicles adjacent to it to facilitate such a pattern. The controller 102 may further forward the notification received at step 406 to other vehicles within the range of the V2V communication signal in order to reach vehicles beyond the range of the V2V communications of the motorcycle 304. Vehicles that receive the notification of step 406 forwarded from another vehicle may likewise forward the notification.

In some embodiments, the vehicle controller 102 that has received a notification of lane-splitting and has not received a notification that lane-splitting has ended or has otherwise not ended its facilitation of lane-splitting, may perform various other functions in order to facilitate lane-splitting. For example, the vehicle controller 102 may omit lane changes that would otherwise be performed for the sake of speeding up travel, i.e. to avoid slower cars but not required to reach a destination. The vehicle controller 102 may signal lane changes longer than when not facilitating lane-splitting. The vehicle controller 102 may perform lane changes slower than when not facilitating lane-splitting. The vehicle controller 102 may drive the vehicle further away from the lane marker, as permitted by available space, in order to provide a wider inter-lane region for the lane-splitting motorcycle to drive in.

In some embodiments, the vehicle controller 102 may notify the motorcycle 304 of lane changes using V2V wireless communications, in addition to the use of signal lights. For example, if, while facilitating lane-splitting, the vehicle controller determines 412 that a lane change will be performed whether out of necessity to reach a destination, avoid an obstacle, or due to a driver turning on a turn signal. In response, the motorcycle controller 118 is notified 414 of the lane change, such as over the V2V communication protocol. The notification at step 414 may additionally or alternatively include a light signal, i.e. changing the light, color of light, or flashing pattern of lighting used to perform the acknowledgement at step 410 in order to emphasize that the vehicle is about to perform a lane change beyond the light signal provided by the vehicle's turn signal.

In response to receiving the notification of step 414, the motorcycle controller 118 may notify 418 the rider of the motorcycle 304 of the lane change. This may include outputting a visual signal such as a flashing light, text message, spoken warning. The notification at step 418 may be provided using a haptic feedback device in the handlebars of the motorcycle 304 or the rider's gloves. Other feedback mechanisms may also be used. In this manner, the rider is made aware of the intended lane change by the vehicle regardless of whether the turn signal of the vehicle The method 400 may include evaluating 420 by the motorcycle controller 118 whether lane-splitting has ended. This may be the opposite of step 402, whereby the image stream from the forward facing camera 310 is analyzed to determine that the condition that indicated lane-splitting longer exists. For example, the motorcycle 304 is no longer within threshold proximity of a lane marker 302. Ending of lane-splitting may also be determined based on an explicit input from the rider received by detecting activation of a button or user interface element interpreted by the controller 118 as indicating this intent.

In response to determining 420 that lane-splitting has ended, notification of the ending of lane-splitting may be transmitted 422 to vehicles within range of the V2V communications of the motorcycle 304. In response to receiving such a notification, vehicle controllers 102 may cease performing actions to facilitate lane-splitting as described above, including the actions of steps 410-414. In some embodiments, vehicle controllers 102 may end facilitating lane-splitting based on other criteria. For example, after receiving the notification at step 406 a countdown may be commenced, upon expiration of which facilitating of lane-splitting will end.

In some embodiments, rather than transmitting 422 a notification that lane-splitting has ended the controller 102 may simply cease transmitting the signal at step 404. For example, the signal sent at step 404 may sent repeatedly throughout lane-splitting. The vehicle controller 102 may then cease facilitating lane-splitting upon ceasing to detect the notification at step 404, i.e. passage of a predetermined period of time greater than the period between repeated notifications while lane-splitting is occurring.

Referring again to FIG. 1, the detection module 120a may include a lane detection module 126. The lane detection module 126 may include any electronic device programmed to output a boundary signal representing the location of the lane boundary relative to the motorcycle 304. In some approaches, the lane detection module 126 may be located, e.g., near a headlight of the motorcycle 304. In some instances, the lane detection module 126 may include a camera configured to capture a video feed of an area ahead of the motorcycle 304. Alternatively, non-camera sensors, such as an ultrasound sensor, a navigation sensor (GPS), an infrared sensor, etc. may be used in addition or as an alternative to the camera. The area ahead of the motorcycle 304 may include one or more road surface markings including, e.g., lane boundaries such as lane dividers, a roadway center line, lane edge markings, or the like. Thus, the boundary signal may include the video feed or other representation of the area ahead of the motorcycle 304.

The V2V module 120b may include any electronic device configured or programmed to facilitate wireless communication among the motorcycle 304 and other, nearby vehicles in accordance with, e.g., a vehicle-to-vehicle communication protocol. An example of a vehicle-to-vehicle communication protocol may include, e.g., the dedicated short range communication (DSRC) protocol. Accordingly, the V2V module 120b may be programmed to receive messages from, or transmit messages to, other nearby vehicles. For instance, as discussed in greater detail below, the V2V module 120b may be programmed to broadcast a lane-splitting signal, indicating that the motorcycle 304 is lane-splitting, to nearby vehicles.

The detection module 120a may include any electronic device programmed to receive the boundary signal and determine, from the boundary signal, whether the motorcycle 304 is performing a lane-splitting maneuver. The detection module 120a may be programmed to process the boundary signal. Processing the boundary signal may include processing the video feed captured by the lane detection module 126 to determine where the lane markers 302 are relative to the motorcycle 304.

Figure 5:
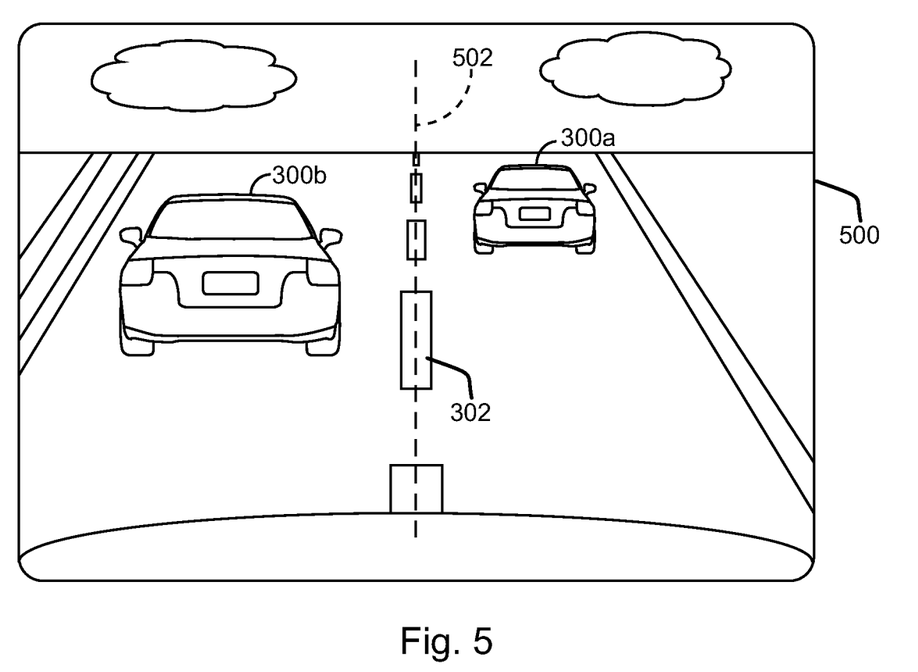
FIGS. 5 and 6 are example images used for determining whether a motorcycle is lane-splitting.

Turning now to FIG. 5, the detection module 120a may compare the location of the lane boundary to a center axis 502 of the motorcycle 304. The center axis 502 may be an imaginary line extending through a center of the motorcycle 304. The detection module 120a may determine that the motorcycle 304 is performing the lane-splitting maneuver if the lane boundary is aligned with, or within a predetermined distance from, the center axis 502. The predetermined distance may be based on the overall width of the motorcycle 304. For instance, the predetermined distance may be, e.g., 50% of the width of the motorcycle 304, 25% of the width of the motorcycle 304, 10% of the width of the motorcycle 304, etc. Moreover, the motorcycle 304 may not travel exactly parallel to the lane boundary while lane-splitting. Thus, the center axis 502 and lane boundary are likely to intersect. The detection module 120a may be programmed to identify the lane-splitting maneuver if the center axis 502 intersects the lane boundary for a predetermined amount of time to, e.g., distinguish lane-splitting from a lane change.

Figure 6:
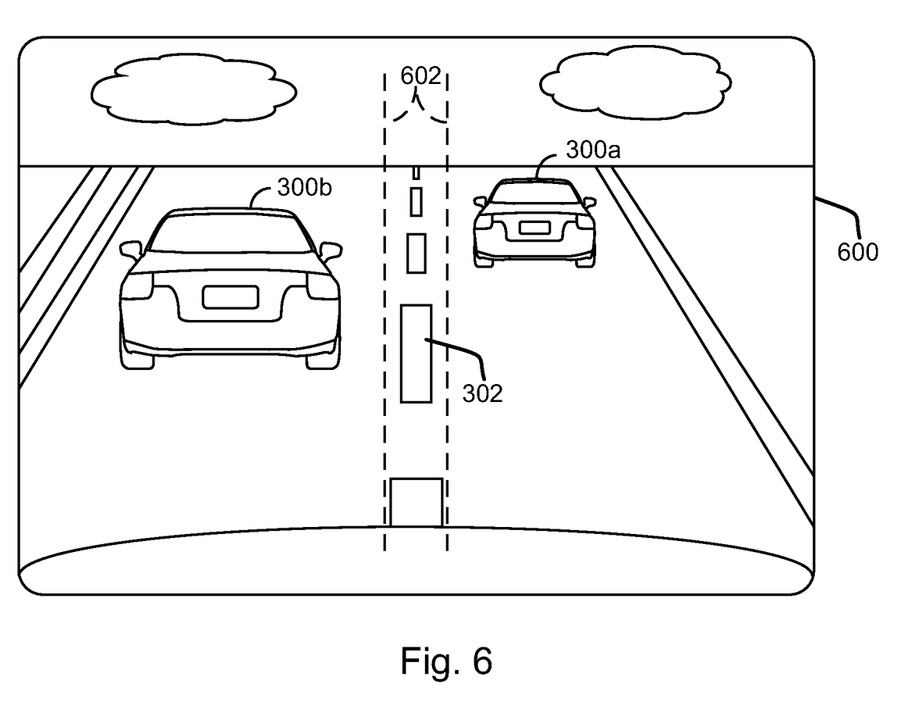

Referring to FIG. 6, alternatively, instead of comparing the location of the lane boundary to the center axis 502, the detection module 120a may be programmed to determine whether the lane boundary is between two imaginary, parallel lines 602 extending along the length of the motorcycle 304. The distance between the parallel lines 602 may be based on the width of the motorcycle 304. For instance, the distance between the parallel lines 602 may be, e.g., 50% of the width of the motorcycle 304, 25% of the width of the motorcycle 304, 10% of the width of the motorcycle 304, etc. The detection module 120a may be programmed to generate the lane-splitting signal in response to, e.g., the lane boundary intersecting one of the parallel lines 602 and remaining between the parallel lines 602 for a predetermined amount of time (e.g., to distinguish lane-splitting from a simple lane change).

The detection module 120a may be programmed to generate and output a lane-splitting signal if the detection module 120a determines that the motorcycle 304 is performing a lane-splitting maneuver. The lane-splitting signal may be transmitted to the V2V module 120b with an instruction to broadcast the lane-splitting signal to nearby vehicles. Vehicles that receive the lane-splitting signal may notify their respective drivers that the motorcycle 304 is lane-splitting. Nearby autonomous vehicles may, in response to receiving the lane-splitting signal, move away from the lane boundary to give the motorcycle 304 more room to maneuver.

FIGS. 5 and 6 are example images 500, 600 that may be processed by the detection module 120a to determine whether to broadcast the lane-splitting signal. The images 500, 600 may be captured by, e.g., a camera 310 coupled to the controller 118.

Referring to FIG. 5, as discussed above, a center axis 502 extends through a center of the motorcycle 304. The lane boundary is within a predetermined distance from the center axis 502, so the detection module 120a may determine that the motorcycle 304 is lane-splitting. As a result, the detection module 120a may generate the lane-splitting signal and output the lane-splitting signal to the V2V module 120b. The V2V module 120b may broadcast the lane-splitting signal to nearby vehicles. The lane boundary need not line up perfectly with the center axis 502. So long as the lane boundary is within a predetermined distance from the center axis 502, the detection module 120a may determine that the motorcycle 304 is lane-splitting. Moreover, the motorcycle 304 need not travel exactly parallel to the lane boundary. Thus, the center axis 502 and lane boundary are likely to intersect. The detection module 120a may be programmed to identify the lane-splitting maneuver if the center axis 502 intersects the lane boundary for a predetermined amount of time so that lane changes can be distinguished from lane-splitting.

Referring now to FIG. 6, the center axis 502 has been replaced by parallel lines 602. When the lane boundary is between the parallel lines 602, the detection module 120a may generate the lane-splitting signal and output the lane-splitting signal to the V2V module 120b, which as discussed above may broadcast the lane-splitting signal to nearby vehicles. The detection module 120a, therefore, may be programmed to generate the lane-splitting signal in response to, e.g., the lane boundary intersecting one of the parallel lines 602 and remaining between the parallel lines 602 for a predetermined amount of time (e.g., to distinguish lane-splitting from a simple lane change).

Figure 7:
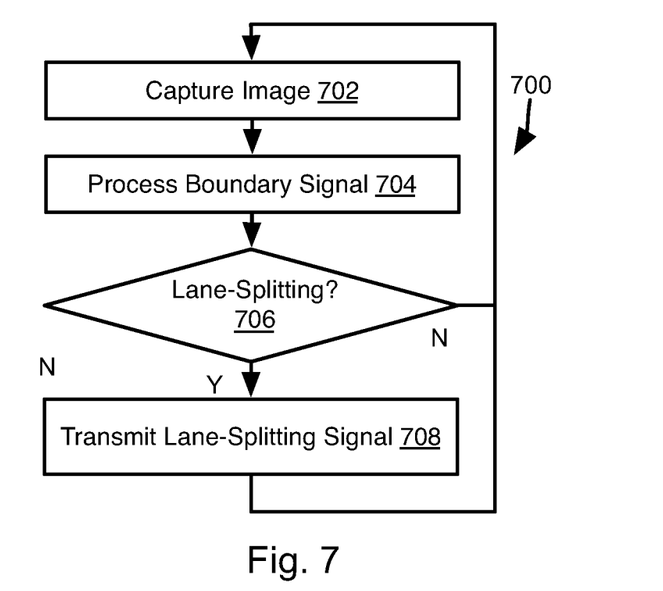
FIG. 7 is a process flow diagram of a method for determining whether a motorcycle is lane-splitting.

FIG. 7 is a flowchart of an example process 700 that may be executed by the motorcycle controller 118 to notify nearby vehicles that the lane-splitting maneuver is being performed. The process 700 may be executed when the motorcycle 304 is turned on and may continue to execute until the motorcycle 304 is parked or otherwise no longer being driven.

At block 702, the detection module 120a may capture an image of an area ahead of the motorcycle 304. The image may be captured by the lane detection module 126 using images from the forward facing camera 310. The lane detection module 126 may generate a boundary signal representing the location of the lane boundary relative to the motorcycle 304, and the boundary signal may be transmitted to the detection module 120a.

At block 704, the detection module 120a may process the boundary signal. The detection module 120a may receive the boundary signal from the lane detection module 126, and processing the boundary signal may include extracting the location of the lane boundary from the boundary signal and comparing the location of the lane boundary to a center axis 502 (see FIG. 5) of the motorcycle 304 or two parallel lines 602 (see FIG. 6) extending along a length of the motorcycle 304. By comparing the location of the lane boundary to the center axis 502 or parallel lines 602, the detection module 120a may determine whether the motorcycle 304 is lane-splitting.

At decision block 706, the lane-splitting notification system 105 may determine whether the motorcycle 304 is lane-splitting. For instance, the detection module 120a may determine whether the motorcycle 304 is lane-splitting based on, e.g., whether the lane boundary is aligned with or within a predetermined distance from the center axis 502 or if the lane boundary is between the parallel lines 602. Alternatively or in addition, the detection module 120a may determine that the motorcycle 304 is lane-splitting if the lane boundary intersects the center line for a predetermined amount of time. If the detection module 120a determines that the motorcycle 304 is lane-splitting, the process 700 may proceed to block 708. Otherwise, the process 700 may return to block 702.

At block 708, the motorcycle controller 118 may generate and transmit the lane-splitting signal. The detection module 120a may generate the lane-splitting signal, indicating that the motorcycle 304 is performing a lane-splitting maneuver, and transmit the lane-splitting signal to the V2V module 120b with an instruction to broadcast the lane-splitting signal to nearby vehicles. The V2V module 120b may transmit the lane-splitting signal in accordance with a vehicle-to-vehicle communication protocol, such as the dedicated short range communication (DSRC) protocol. The process 700 may proceed to block 702 after the lane-splitting signal has been broadcast. Accordingly, the lane-splitting signal may be transmitted 708 repeatedly so long as the motorcycle 304 is determined to be lane-splitting.

The present invention may be embodied in other specific forms without departing from its spirit or essential characteristics. The described embodiments are to be considered in all respects only as illustrative, and not restrictive. For example, references to a motorcycle throughout may apply to any vehicle that is capable of performing lane-splitting, such as three wheeled vehicle, bicycle, or other type of vehicle sized to fit between vehicles occupying adjacent lanes. The scope of the invention is, therefore, indicated by the appended claims, rather than by the foregoing description. All changes which come within the meaning and range of equivalency of the claims are to be embraced within their scope.

What is claimed is:

1. A controller for an autonomous vehicle comprising:
one or more processing devices programmed to—
receive a notification from a first vehicle, the notification indicating that the first vehicle is lane-splitting along a lane boundary defined by markings on a road surface; and
transmit acknowledgment to the first vehicle of the notification;
wherein the one or more processing devices are further programmed to transmit acknowledgment to the first vehicle by flashing lights located on a side of the autonomous vehicle facing the lane boundary;
wherein the one or more processing devices are further programmed to forward the notification to one or more other vehicles adjacent the autonomous vehicle and located on either side of the lane boundary; and
wherein the one or more processing devices are further programmed to coordinate flashing the lights with the one or more other vehicles to define a lane-splitting zone along the lane boundary.

2. The controller of claim 1, wherein the one or more processing devices are further programmed to transmit acknowledgment to the first vehicle by transmitting a wireless signal to the first vehicle.

3. The controller of claim 1, wherein the one or more processing devices are further programmed to refrain from performing lane-changes across the lane boundary in response to the notification.

4. The controller of claim 1, wherein the one or more processing devices are further programmed to move the autonomous vehicle away from the lane boundary in response to the notification.

5. The controller of claim 1, wherein the one or more processing devices are further programmed to:
detect a lane change across the lane boundary invoked by one of a driver of the autonomous vehicle and the controller;
in response to detecting the lane change, transmit a second notification to the first vehicle over a vehicle-to-vehicle wireless communication protocol, the second notification indicating that the autonomous vehicle is going to perform the lane change.

6. The controller of claim 1, wherein the one or more processing devices are coupled to at least one of a steering actuator, accelerator actuator, and brake actuator; and
wherein the one or more processing devices are further programmed to limit movement of the autonomous vehicle toward the lane boundary by activating one or more of the steering actuator, accelerator actuator, and brake actuator to limit movement toward the lane boundary.

7. The controller of claim 6, wherein the one or more processing devices are further coupled to one or more sensing devices; and
wherein the one or more processing devices are further programmed to:
receive one or more outputs from the one or more sensing devices;
identify a set of potential obstacles from the outputs of the one or more sensing devices;
evaluate possible collisions between the autonomous vehicle and the set of potential obstacles; and
activate at least one of the steering actuator, the accelerator actuator, and the brake actuator of the autonomous vehicle effective to avoid collisions with the set of potential obstacles and the first vehicle.

8. A method comprising:
receiving, by a controller of an autonomous vehicle, a notification from a first vehicle, the notification indicating that the first vehicle is lane-splitting, the controller including one or more processing devices;
transmitting, by the controller, acknowledgment to the first vehicle of the notification;
wherein transmitting acknowledgment to the first vehicle comprises activating, by the controller, flashing lights located on a side of the autonomous vehicle facing a lane boundary defined by marking on a road surface;
wherein the method further comprises:
forwarding the notification to one or more other vehicles adjacent the autonomous vehicle and located on either side of the lane boundary; and
coordinating, by the controller, flashing the lights with the one or more other vehicles to define a lane-splitting zone along the lane boundary.

9. The method of claim 8, further comprising transmitting the acknowledgment to the first vehicle by transmitting a wireless signal to the first vehicle.

10. The method of claim 8, further comprising refraining from performing lane-changes in response to the notification.

11. The method of claim 8, further comprising slowing performing of lane-changes in response to the notification relative to a speed of lane changes without the notification.

12. The method of claim 8, further comprising:
detecting, by the controller, a lane change invoked by one of a driver of the autonomous vehicle and the controller;
in response to detecting the lane change, transmitting, by the controller, a second notification to the first vehicle over a vehicle-to-vehicle wireless communication protocol, the second notification indicating that the autonomous vehicle is going to perform the lane change.

13. The method of claim 8, wherein the controller is coupled to at least one of a steering actuator, accelerator actuator, and brake actuator, the method further comprising:
activating one or more of the steering actuator, accelerator actuator, and brake actuator to limit movement toward the land boundary.

14. The method of claim 13, further comprising:
receiving, by the controller, one or more outputs from one or more sensing devices;
identifying, by the controller, a set of potential obstacles from the one or more outputs of the one or more sensing devices;
evaluating, by the controller, possible collisions between the autonomous vehicle and the set of potential obstacles; and
activating, by the controller, at least one of the steering actuator, the accelerator actuator, and the brake actuator of the autonomous vehicle effective to avoid collisions with the set of potential obstacles and the first vehicle.

* * * * *

UNITED STATES PATENT AND TRADEMARK OFFICE
CERTIFICATE OF CORRECTION

PATENT NO. : 10,698,404 B2
APPLICATION NO. : 15/761733
DATED : June 30, 2020
INVENTOR(S) : Zachary David Nelson It is certified that error appears in the above-identified patent and that said Letters Patent is hereby corrected as shown below:

In the Claims

Column 12, Line 26 should read:
8. A method comprising: receiving, by a controller of an autonomous vehicle, a notification from a first vehicle, the notification indicating that the first vehicle is lane-splitting, the controller including one or more processing devices; transmitting, by the controller, acknowledgment to the first vehicle of the notification; wherein transmitting acknowledgment to the first vehicle comprises activating, by the controller, flashing lights located on a side of the autonomous vehicle facing a lane boundary defined by markings on a road surface; wherein the method further comprises: forwarding the notification to one or more other vehicles adjacent the autonomous vehicle and located on either side of the lane boundary; and coordinating, by the controller, flashing the lights with the one or more other vehicles to define a lane-splitting zone along the lane boundary.

Column 12, Line 50 should read:
11. The method of claim 8, further comprising slowing performance of lane-changes in response to the notification relative to a speed of lane changes without the notification.

Column 12, Line 62 should read:
13. The method of claim 8, wherein the controller is coupled to at least one of a steering actuator, accelerator actuator, and brake actuator, the method further comprising: activating one or more of the steering actuator, accelerator actuator, and brake actuator to limit movement toward the lane boundary.

Signed and Sealed this
Twenty-second Day of December, 2020

Andrei Iancu
*Director of the United States Patent and Trademark Office*